(12) United States Patent
Sakuma et al.

(10) Patent No.: US 7,492,971 B2
(45) Date of Patent: Feb. 17, 2009

(54) SELECTION OF ELEMENTS STRONGLY RELATED TO A PREDETERMINED REFERENCE ELEMENT

(75) Inventors: Jun Sakuma, Tokyo-to (JP); Michael Edward Houle, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 11/125,494

(22) Filed: May 10, 2005

(65) Prior Publication Data

US 2006/0039612 A1    Feb. 23, 2006

(30) Foreign Application Priority Data

May 11, 2004    (JP)    ............................. 2004-141515

(51) Int. Cl.
    *G06K 9/54*    (2006.01)
(52) U.S. Cl. ...................................... 382/305
(58) Field of Classification Search .................. None
    See application file for complete search history.

(56) References Cited

U.S. PATENT DOCUMENTS

| | | | | |
|---|---|---|---|---|
| 5,305,389 | A | * | 4/1994 | Palmer ........................ 382/305 |
| 5,644,765 | A | * | 7/1997 | Shimura et al. ........... 707/104.1 |
| 5,684,999 | A | * | 11/1997 | Okamoto ........................ 704/9 |
| 6,418,434 | B1 | * | 7/2002 | Johnson et al. ................. 707/5 |

FOREIGN PATENT DOCUMENTS

JP    2000112973    4/2000

OTHER PUBLICATIONS

Japanese Publication No. 2003-256477 published on Sep. 12, 2003.

V. Pestov, "On the geometry of similarity search: Dimensionally curse and concentration of measure," Information processing letters, 73: 47-51, 2000.

M. Houle, "SASH: a Spatial Approximation Sample Hierarchy for Similarity Search," IBM Tokyo Research Laboratory Research Report RT-0446, Feb. 18, 2002.

Osamu Watanabe, "To Randomized Algorithm World, Draft collection of Information Processing based on Probabilistic Algorithm," Internet Home Page http://www.statp.is.tohoku.ac.jp/kazu/SMAPIP/2003/tutorial/index.html, This URL has been deleted, therefore, the document could not be obtained.

(Continued)

*Primary Examiner*—Matthew C. Bella
*Assistant Examiner*—Alex Liew
(74) *Attorney, Agent, or Firm*—Scully, Scott, Murphy & Presser, P.C.; Lisa M. Yamonaco

(57) ABSTRACT

Selection devices, methods and systems for selecting, among a plurality of elements, a nearest neighbor set which is a set of elements each having a relation to a predetermined reference element, a degree of the relation meeting a predetermined condition. A selection device includes: a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set; and a nearest neighbor set selection unit for selecting, as the nearest neighbor set, a set of elements having relations, degrees of which meet the predetermined condition, to the reference element, among a union of the plurality of nearest neighbor set candidates.

8 Claims, 8 Drawing Sheets

OTHER PUBLICATIONS

R. Motwania and P. Raghavan, Randomized Algorithms, Cambridge 1995.

Y. Yang and X. Liu, A re-examination of text categorization, Proc. of the 22nd International ACM SIGIR Conference on Research and development in Information Retrieval, Morgan Kaufman, 1999.

M. Houle, Navigating Massive Data Sets via Local Clustering, IBM Tokyo Research Laboratory Research Report RT-0518, Mar. 5, 2002.

G. Salton, The Smart Retrieval System-Experiments in Automatic Document Processing, Prentice-Hall, Englewood Cliffs, NJ, USA, 1971. This book is only a historical reference.

Jeffery K. Uhlmann, Satisfying general proximity/similarity queries with metric trees, Inf. Proc. Letters 40, pp. 175-179, 1991.

G. Navvarro, Searching in metric spaces by spatial approximation, IN Proc. Of String Processing and Information Retrieval, pp. 141-148, 1999.

* cited by examiner

United States Patent US 7,492,971 B2

SELECTION OF ELEMENTS STRONGLY RELATED TO A PREDETERMINED REFERENCE ELEMENT

FIELD OF THE INVENTION

The present invention relates to selecting a set of elements strongly related to a predetermined reference element among a plurality of elements stored in a database or the like.

BACKGROUND OF THE INVENTION

In recent years, along with development and widespread use of computers, various data have been computerized. The computerized data are utilized in various industries. For example, there have been proposed marketing research conducted based on data obtained by computerizing product purchase behavior, and prediction of stock price fluctuations based on data obtained by computerizing economic indicators and the like. However, if there are enormous amounts of computerized data, it is difficult to properly select desired data only. Accordingly, technologies such as data search have been conventionally used.

The following documents are considered:

[Patent Document 1] Japanese Patent Laid-Open Publication No. 2003-256477

[Non-Patent Document 1] V. Pestov, On the geometry of similarity search: dimensionality curse and concentration of measure, Information Processing Letters, 73:47-51, 2000

[Non-Patent Document 2] Michael E. Houle, SASH: a spatial approximation sample hierarchy for similarity search, IBM Tokyo Research Laboratory Research Report RT-0446, 18 pages, Feb. 18, 2002

[Non-Patent Document 3] "To the world of randomized algorithm, information processing based on probabilistic algorithm" written by Osamu Watanabe, homepage on the Internet "http://www.statp.is.tohoku.ac.jp/kazu/SMAPIP/2003/tutorial/index.html"

[Non-Patent Document 4] R. Motwania and P. Raghavan, Randomized Algorithms, Cambridge, 1995

[Non-Patent Document 5] Y. Yang and X. Liu, A re-examination of text categorization, Proc, Of the 22nd Annual International ACM SIGIR Conf. On research and development in Information Retrieval, Morgan Kaufman, 1999

[Non-Patent Document 6] Michael E. Houle, Navigating Massive Data Sets via Local Clustering, IBM Tokyo Research Laboratory Research Report RT-0518, 15 pages, Mar. 5, 2002.

[Non-Patent Document 7] G. Salton, The SMART Retrieval System-Experiments in Automatic Document Processing, Prentice-Hall, Englewood Cliffs, N.J., USA, 1971.

[Non-Patent Document 8] Chavez, E., Navarro G., Baeza-yates, R. and Marroquin, J. L, Satisfying general proximity/similarity queries with metric trees, Inf. Proc. Lett. 40, pp. 175-179, 1991

[Non-Patent Document 9] Navvarro, G., Searching in metric spaces by spatial approximation, IN Proc. Of String Processing and Information Retrieval, pp. 141-148, 1999

As a basic issue of the data search, there has been heretofore known k-nearest neighbor search for searching k pieces of data adjacent to a given query. In the k-nearest neighbor search, if there is a massive set of data to be searched, or if the number of dimensions of parameters indicating properties of data is large, an enormous computation time is required to accurately obtain k pieces of data nearest to the query. Thus, there has been proposed an approximate solution method for approximately processing the k-nearest neighbor search in a realistic computation time (see Patent Document 1, Non-Patent Document 2, and Non-Patent Document 6). For example, the technology of Patent Document 1 has been proposed as an effective method for "dimensionality curse" described in Non-Patent Document 1.

Meanwhile, there has been known an amplification technique as a method for improving results obtained by execution of a non-deterministic algorithm producing different processing results for each time of execution. For example, in a computation for determining whether or not a product of matrix A and matrix B is matrix C, although there is a possibility of returning a wrong answer with a certain probability, in the methods of Non-Patent Documents 3 and 4, it is possible to set the probability to be very small. Thus, the determination can be made with a smaller computational effort than that of using a method for surely returning a right answer.

According to the technology described in Patent Document 1 or the like, a computation time is cut back by narrowing a range of searching k pieces of data nearest to a query, in relation to an entire data to be actually searched. Therefore, the computation time and accuracy of approximation are in a trade-off relationship, and a trade-off ratio is approximately constant. Thus, for example, in order to improve the accuracy of approximation, the computation time has to be increased by widening the range of the search. In consideration of the foregoing problem, it is an object of the present invention to improve the trade-off ratio described above, in other words, for example, to improve the accuracy of approximation without increasing the computation time.

Non-Patent Document 5 and Non-Patent Documents 7 to 9 are described later.

SUMMARY OF THE INVENTION

Accordingly, it is an object of the present invention to provide a selection device, a selection method, a program, and a recording medium, which can solve the foregoing problem. This object is achieved by combining features described in the independent claims in the scope of claims. Moreover, the dependent claims define further advantageous specific examples of the present invention.

In order to solve the foregoing problem, according to a first aspect of the present invention, there are provided: a selection device for selecting a nearest neighbor set among a plurality of elements, the nearest neighbor set being a set of elements each having a relation to a predetermined reference element, a degree of the relation meeting a predetermined condition; a selection method using the selection device; a program causing a computer to function as the selection device; and a recording medium recording the program. Specifically, the selection device includes: a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set; and a nearest neighbor set selection unit for selecting, as the nearest neighbor set, a set of elements having relations, degrees of which meet the predetermined condition, to the reference element, among a union of the plurality of nearest neighbor set candidates. Note that the foregoing summary of the invention does not enumerate all necessary features of the present invention. Combinations of these feature groups can also become inventions. According to the present invention, it is possible to effectively obtain a nearest neighbor set.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

The present invention provides a selection device, a selection method, a program, and a recording medium, for selecting a set of elements strongly related to a predetermined reference element among a plurality of elements stored in a database or the like in a manner that solves the foregoing problem. In example embodiments, the present invention provides a selection device for selecting a nearest neighbor set among a plurality of elements, the nearest neighbor set being a set of elements each having a relation to a predetermined reference element, a degree of the relation meeting a predetermined condition; a selection method using the selection device; a program causing a computer to function as the selection device; and a recording medium recording the program. Specifically, the selection device includes: a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set; and a nearest neighbor set selection unit for selecting, as the nearest neighbor set, a set of elements having relations, degrees of which meet the predetermined condition, to the reference element, among a union of the plurality of nearest neighbor set candidates. Note that the embodiments of the invention do not enumerate all necessary features of the present invention. Combinations of these feature groups employing the concept of this invention can also become inventions. Thus, according to the present invention, it is possible to effectively obtain a nearest neighbor set. Moreover, not all combinations of features described in the embodiments are essential for the invention.

Figure 1:
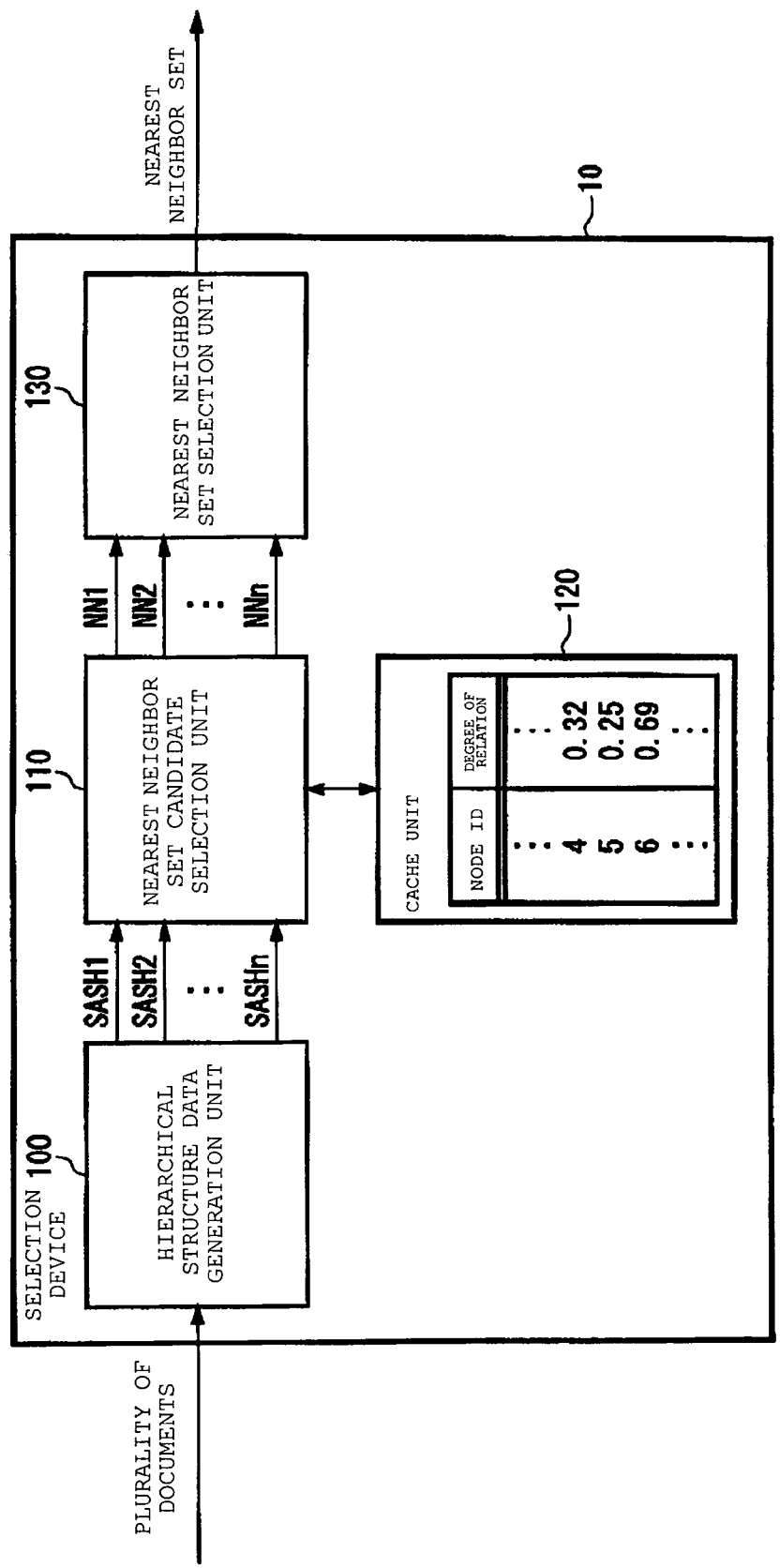
FIG. 1 is a functional block diagram of a selection device 10.

FIG. 1 is a functional block diagram of a selection device 10. The selection device 10 is intended to efficiently select a nearest neighbor set among a plurality of elements, for example, a plurality of documents, the nearest neighbor set being a set of a predetermined and pre-fixed number of elements which are strongly related to a predetermined reference element. Here, the reference element is, for example, a query for searching a database, and the plurality of elements are a set of data stored in the database. Specifically, for example, the selection device 10 is intended to efficiently select data similar to the query for the database.

The selection device 10 includes a hierarchical structure data generation unit 100, a nearest neighbor set candidate selection unit 110, a cache unit 120, and a nearest neighbor set selection unit 130. The hierarchical structure data generation unit 100 inputs a plurality of documents as a plurality of elements to be selected. Thereafter, the hierarchical structure data generation unit 100 sets each of the plurality of elements as a node, and generates a plurality of pieces of hierarchical structure data obtained by classifying the plurality of nodes into any of a plurality of predetermined hierarchies. This hierarchical structure data is, for example, SASH generated by the method described in Patent Document 1. In the following description, the above-described plurality of pieces of hierarchical structure data will be called SASH1 to SASHn.

Next, for each SASH, the hierarchical structure data generation unit 100 generates an edge between the node classified into each of the plurality of hierarchies and another node adjacent to the hierarchy, based on a degree of a relation between the node and the other node. Subsequently, based on SASH1 to SASHn, the nearest neighbor set candidate selection unit 110 selects a plurality of nearest neighbor set candidates which are a plurality of different candidates for a nearest neighbor set. To be more specific, for each of SASH1 to SASHn, the nearest neighbor set candidate selection unit 110 selects, among the plurality of elements, a set of elements determined to have a stronger relation to the reference element based on the SASH, as one nearest neighbor set candidate. These selected nearest neighbor set candidates are set to be NN1 to NNn.

Here, the nearest neighbor set (k-nearest neighbor) means a set of k pieces of elements having the strongest relation to a certain reference element. Meanwhile, since the selection device 10 approximately obtains the nearest neighbor set, the nearest neighbor set obtained by the selection device 10 may be different from an actual nearest neighbor set. In the following description, for convenience, the approximate nearest neighbor set obtained by the selection device 10 is called a "nearest neighbor set", and the actual nearest neighbor set is called a "true nearest neighbor set."

Subsequently, the cache unit 120 caches a degree of a relation between the reference element and each of the other elements, the degree of the relation being calculated for selecting an element having a stronger relation to the reference element by the nearest neighbor set candidate selection unit 110. For example, the cache unit 120 stores, a node ID for identifying each of the other elements and a relevance ratio indicating the degree of the relation between the reference element and the element, in association with each other. Thereafter, based on the degree of the relation cached in the cache unit 120, the nearest neighbor set candidate selection unit 110 may select a nearest neighbor set candidate. Subsequently, among a union of NN1 to NNn, the nearest neighbor set selection unit 130 selects, as a nearest neighbor set, a set of elements each having a relation to the reference element, a degree of the relation meeting a predetermined condition. Thereafter, the nearest neighbor set selection unit 130 outputs a selection result.

Figure 2:
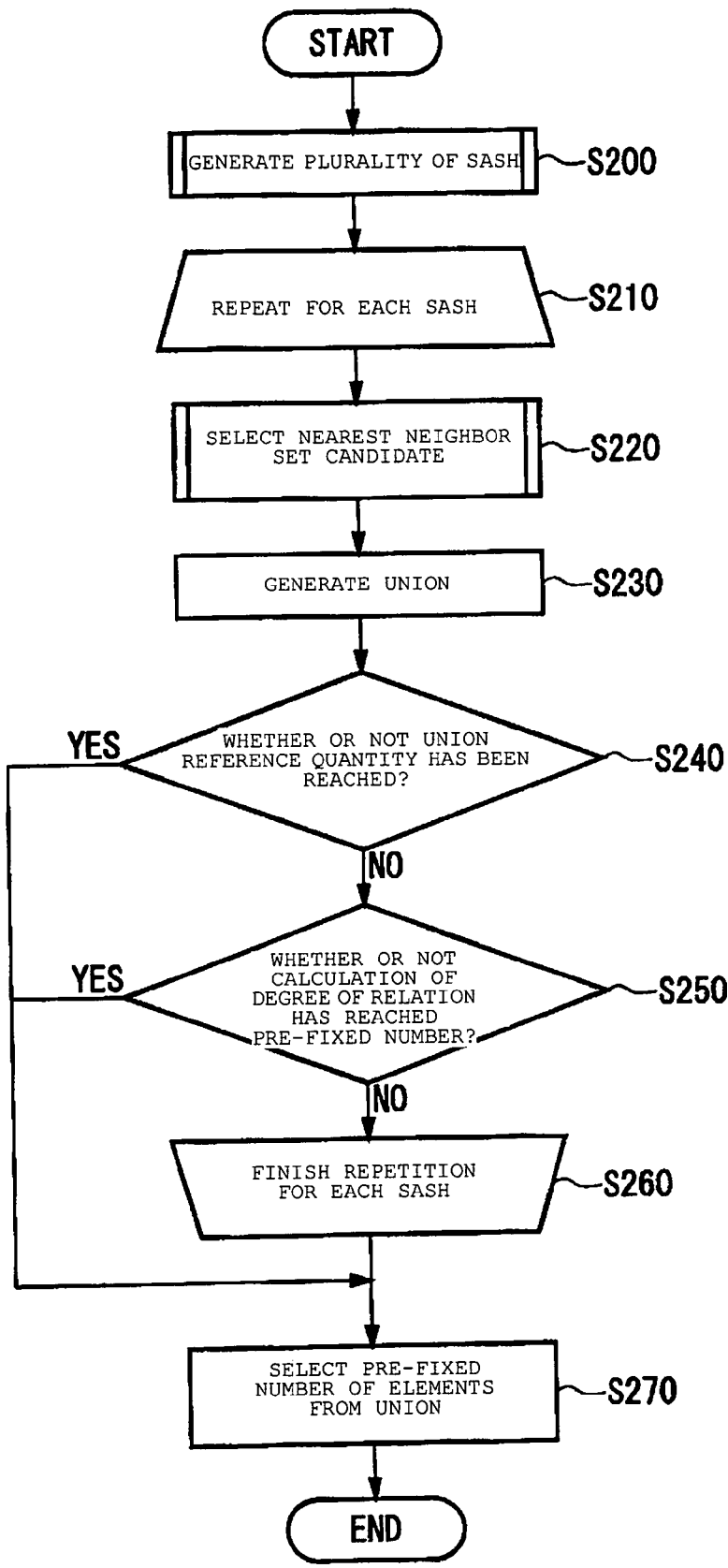
FIG. 2 shows an operational flow of processing of selecting a nearest neighbor set by the selection device 10.

FIG. 2 shows an operational flow of processing of selecting the nearest neighbor set by the selection device 10. The hierarchical structure data generation unit 100 generates a plurality of SASH (S200). Instead of SASH, the hierarchical structure data generation unit 100 may generate VPT or SAT as the hierarchical structure data. Since a method for generating VPT is described in Non-Patent Document 8, description thereof will be omitted in this embodiment. Since a method for generating SAT is described in Non-Patent Document 9, description thereof will be omitted in this embodiment.

Next, for each SASH, the selection device 10 repeats the following processing (S210). First, based on the SASH, the nearest neighbor set candidate selection unit 110 selects one nearest neighbor set candidate (S220). Next, the nearest neighbor set candidate selection unit 110 generates a union of already selected nearest neighbor sets and this newly selected nearest neighbor set candidate (S230). Thereafter, the nearest neighbor set candidate selection unit 110 determines whether or not the number of elements of this generated union has reached a union reference quantity which is previously set to a value of a pre-fixed number or more (S240).

If the number has reached the union reference quantity (S240: YES), the selection device 10 finishes this repetition processing and moves on to S270. Specifically, the nearest neighbor set candidate selection unit 110 sequentially selects a plurality of nearest neighbor set candidates until the number of elements of the generated union reaches the union reference quantity. On the other hand, if the number has not reached the union reference quantity (S240: NO), the nearest neighbor set candidate selection unit 110 determines whether or not the number of times of calculating the degree of the relation between the reference element and each of the other elements in order to select the nearest neighbor set candidate has reached a predetermined pre-fixed number of times (S250).

If the pre-fixed number has been achieved (S250: YES), the selection device 10 moves the process on to S270. Specifically, the nearest neighbor set candidate selection unit 110 sequentially selects a plurality of nearest neighbor set candidates until the number of times of calculating the degree of the relation reaches the pre-fixed number. On the other hand, if the pre-fixed number has not been reached (S250: NO), the selection device 10 returns to S220 and moves to the processing for the other SASH.

The selection device 10 repeats the above-described processing for each SASH (S260). Subsequently, the nearest neighbor set selection unit 130 selects, as a nearest neighbor set, a set of a pre-fixed number of elements more strongly related to the reference element among the union of the plurality of nearest neighbor set candidates (S270). Specifically, the nearest neighbor set selection unit 130 rearranges the respective elements included in the union in descending order of the relation to the reference element. Thereafter, the nearest neighbor set selection unit 130 selects, as the nearest neighbor set, the pre-fixed number of elements after redundant elements are removed from the top of the rearranged elements described above.

Alternatively, the nearest neighbor set selection unit 130 may select, as the nearest neighbor set, all the elements which are stronger in terms of the relations to the reference element than a predetermined reference value. Specifically, as to the degree of the relation to the reference element, the nearest neighbor set selection unit 130 selects the elements having a strong relation to the reference element by applying some kind of a predetermined condition.

Here, as to the case where the respective elements are documents, more detailed description will be given of an example of processing of calculating a relevance ratio indicating a degree of a relation between the elements.

The nearest neighbor set selection unit 130 calculates a relevance ratio between a reference document that is the reference element and each of other documents included in the union of the nearest neighbor set candidates, based on the number of keywords included in the reference document and the other document in common. More specifically, first, for each of the documents, the nearest neighbor set selection unit 130 generates a vector indicating a group of keywords included in the document. Each element of the vector takes a binary value, which is 1 indicating that a corresponding document includes a keyword, or 0 indicating that the document includes no keyword.

Instead of the binary value, each element of the vector may take a continuous value with a magnitude. For example, each element may have a value based on the number of times and frequency of using a keyword corresponding to the element in a document, and a place of appearance of the keyword. To be more specific, when a keyword of an element of a certain vector is used in a title of a chapter or a section of a document, the element may have a higher value than that when the keyword is used in another place. Since such a method for generating a vector has been heretofore publicly known as a TF/IDF technology, more detailed description thereof will be omitted.

Accordingly, based on a vector v corresponding to a certain document and a vector w corresponding to another document, the nearest neighbor set selection unit 130 generates a relevance ratio indicating a degree of a relation between these documents. In this embodiment, the relevance ratio is a value based on a distance between the documents, which is calculated by the following formula (1). As compared with the case where the calculated distance is longer, the relevance ratio becomes larger when the distance is shorter.

[Formula 1]

$$dist(v, w) = \cos^{-1} \frac{v \cdot w}{\|v\| \|w\|} \quad (1)$$

As a result, the nearest neighbor set selection unit 130 can select, as a nearest neighbor set, a document which has the number of keywords included in common with the reference document, the number meeting a predetermined condition, among the union of the plurality of nearest neighbor set candidates.

Note that, as another example, the respective elements may be multimedia data such as moving images. In this case, the nearest neighbor set candidate selection unit 110 selects, as each of a plurality of nearest neighbor set candidates, a set of moving images determined to be more similar to a reference moving image that is a reference element, among a plurality of moving images. Thereafter, the nearest neighbor set selection unit 130 selects, as a nearest neighbor set, images each having a degree of a similarity to the reference moving image, the degree of the similarity meeting a predetermined condition, among a union of the plurality of nearest neighbor set candidates. As described above, the selection device 10 in this embodiment can be applied to various data capable of calculating a degree of a relation therebeween.

Figure 3:
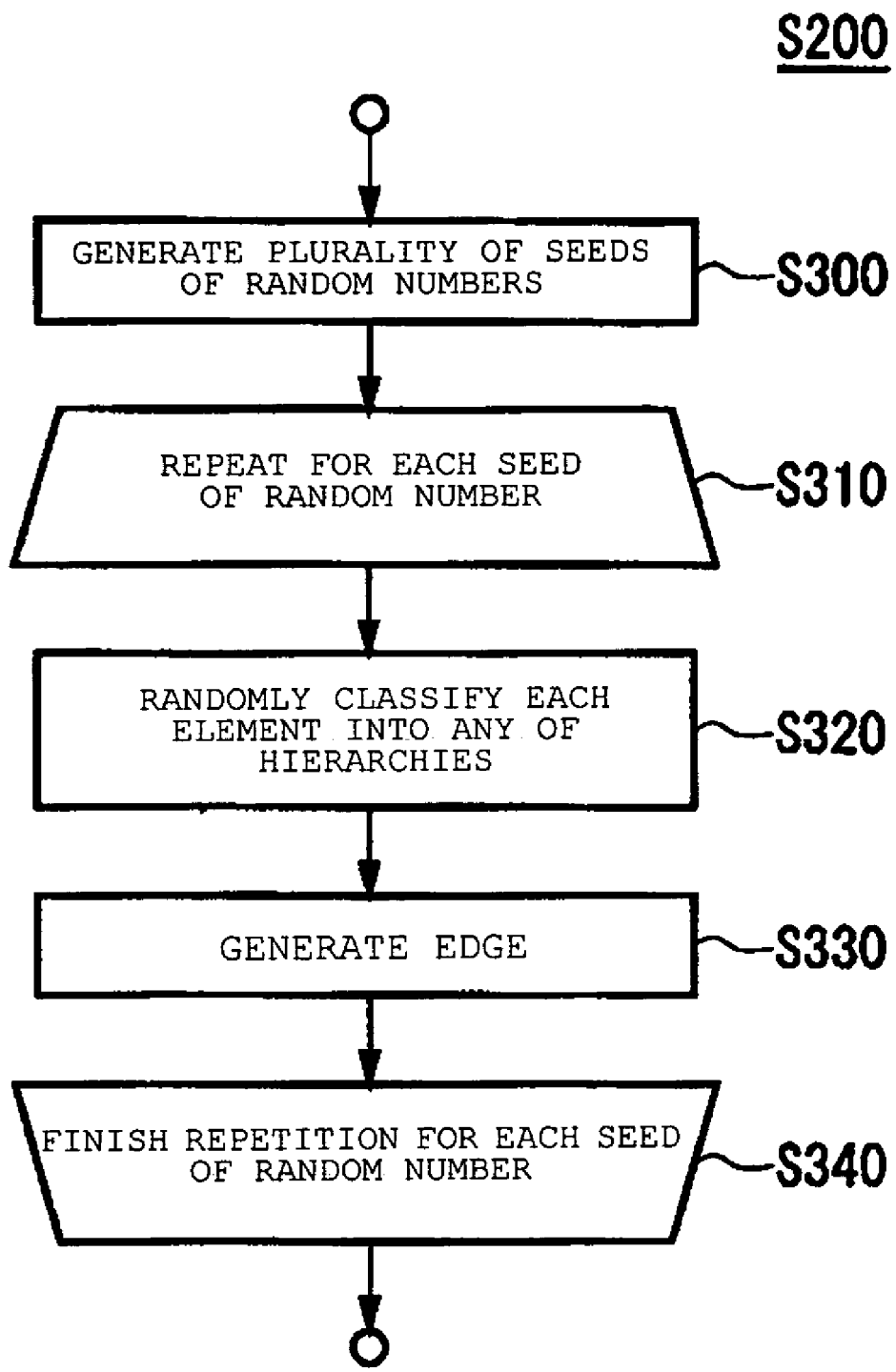
FIG. 3 shows an operational flow of processing in S200 of FIG. 2.

FIG. 3 shows an operational flow of processing in S200 of FIG. 2. The hierarchical structure data generation unit 100 generates a plurality of seeds of random numbers different from each other (S300). Thereafter, the hierarchical structure data generation unit 100 repeats the following processing for the respective seeds of the random numbers (S310). First, the hierarchical structure data generation unit 100 uses the seed of the random number and randomly classifies each of a plurality of nodes indicating a plurality of elements into any of a plurality of hierarchies (S320).

Next, the hierarchical structure data generation unit 100 generates an edge between the node classified into each of the plurality of hierarchies and another node adjacent to the hierarchy, based on a degree of a relation between the nodes (S330). To be more specific, for each of the nodes to be processed, which are classified into the respective hierarchies, the hierarchical structure data generation unit 100 selects, as parent nodes, a predetermined number of nodes determined to be more strongly related to the node to be processed among the nodes positioned in a hierarchy adjacent to a higher level of the hierarchy. Accordingly, the hierarchical structure data generation unit 100 generates edges between the node to be processed and the respective parent nodes selected.

Furthermore, for each of the nodes to be processed, which are classified into the respective hierarchies, the hierarchical structure data generation unit 100 selects a set of nodes having the node to be processed as the parent node among the nodes positioned in a hierarchy adjacent to a lower level of the hierarchy. Thereafter, the hierarchical structure data generation unit 100 selects, as child nodes, a predetermined number of nodes determined to be more strongly related to the node to be processed among the selected set. Subsequently, the hierarchical structure data generation unit 100 generates edges between the node to be processed and the respective child nodes selected.

To be more specific, the hierarchical structure data generation unit 100 generates, as SASH, a directed graph having the following properties.

each node corresponds to each element.

SASH has a hierarchical structure, and each node belongs to any of levels indicating hierarchies. Only one node belongs to the highest hierarchical level, and the node is called a root node. When there are n of elements in total, n/2 of nodes belong to the lowest hierarchical level. As to the levels of SASH, the highest hierarchy is set to 1, and the lowest hierarchy is set to h.

The edges are provided only between the nodes belonging to the levels adjacent to each other. Here, attention is focused on, for example, the node v belonging to the level 1. Nodes which belong to the level (1−1) and are connected to v by the edges are called parent nodes of v. There are p of edges at most from v to the parent nodes. Moreover, nodes which belong to the level (1+1) and are connected to v by the edges are called child nodes. There are c of edges at most from v to the child nodes.

All the nodes other than the root node have at least one parent node. All the nodes, except the root node, invariably have one parent called a guarantor. g(v) that is the guarantor of v has v as the child node. In this event, v is called a dependent.

Next, an algorithm for connecting the nodes of the level 1 to the SASH constructed to have the level 1 to the level (1−1) will be described below.

Algorithm: ConnectSASHLevel(1)

Step 1: If l=2, all nodes of the level 2 connect the root node as the parent node and the guarantor. The root node connects all the nodes of the level 2 as the child nodes and the dependent.

Step 2: if l.2, for each of the nodes v of the level 1, the nearest neighbor set Pi(v,p) is calculated from each level of the level 1.i<l by use of the following method.

Step 2(a): If i=1, $P_i(v,p)$ is the root node.

Step 2(b): If i.1, $P_i'(v)$ is selected as a set of child nodes of respective nodes included in $P_{i-1}(v,p)$. However, the same node is not redundantly selected.

Step 2(c): p of nodes nearest to v are selected from $P_i'(v)$ in which i.1, and are set to $P_i(v,p)$. If $|P_i'(v)|<p$, $P_i(v,p)=P_i'(v)$ is established.

Step 3: The parent nodes of the node v are set to $P_{i-1}(v,p)$. The respective nodes v of the level 1 have p of different parents, respectively.

Step 4: For the respective nodes u in the level (1−1), edges to child nodes are generated by the following procedure.

Step 4(a): For the respective nodes u of the level (1−1), nodes of the level 1, which select u as the parent node, are set to C(u).

Step 4(b): C(u) is sorted in order of a degree of a relation to u.

Step 4(c): If C(u) is c or more, the c+1th element and subsequent elements of C(u) are discarded.

Step 4(d): child nodes of u are set to C(u).

Step 5: For the respective nodes v of the level 1, it is determined whether or not the node v is a child node of any of the nodes of the level (1−1). If the node v is the child node, the parent node most strongly related to v, among the parent nodes of the node v, is set to the guarantor. If it is determined that the node v is not the child node of any of the nodes, the node v is set to an orphan node.

Step 6: For each orphan node of the level 1, any of the nodes of the level (1−1) is selected as the guarantor by the following procedure. Here, a parent node having less than c of child nodes is called an unencumbered node.

Step 6(a): i=1 is set.

Step 6(b): $P_{i-1}(v,2^i p)$ is calculated.

Step 6(c): If $P_{i-1}(v,2^i p)$ includes no unencumbered node, i is incremented, and the processing returns to Step 6(b).

Step 6(d): If $P_{i-1}(v,2^i p)$ includes unencumbered nodes, the unencumbered node nearest to the node v is selected from $P_{i-1}(v,2^i p)$, and this unencumbered node is set to the guarantor. Moreover, the node v is set as an individual node. Furthermore, the node v is set as the dependent of g(v), and a parent node most weakly related to the node v is replaced with g(v).

The hierarchical structure data generation unit 100 generates a plurality of different SASH by repeating the above-described processing for each of the seeds of the random numbers (S340).

Figure 4:
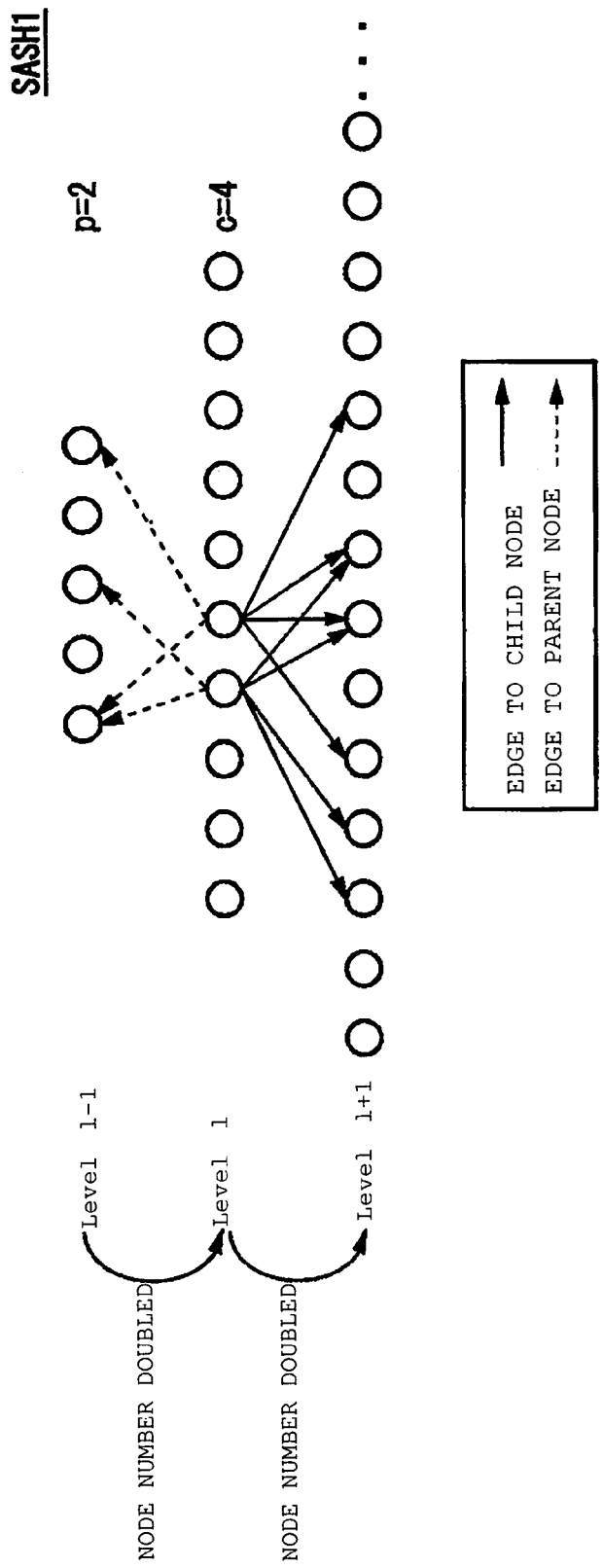
FIG. 4 shows an example of SASH generated by a hierarchical structure data generation unit 100.

FIG. 4 shows an example of SASH generated by the hierarchical structure data generation unit 100. The circles indicate respective nodes. Moreover, the number of nodes in the level l+1 is twice the number of nodes in the level 1. Similarly, the number of nodes in the level 1 is twice the number of nodes in the level l−1. The arrows connecting the respective nodes indicate relationships between parent nodes and child nodes. As shown by the dotted arrows, each of the child nodes has two parent nodes at the maximum. Moreover, as shown by the solid arrows; each of the parent nodes has four child nodes at the maximum.

Figure 5:
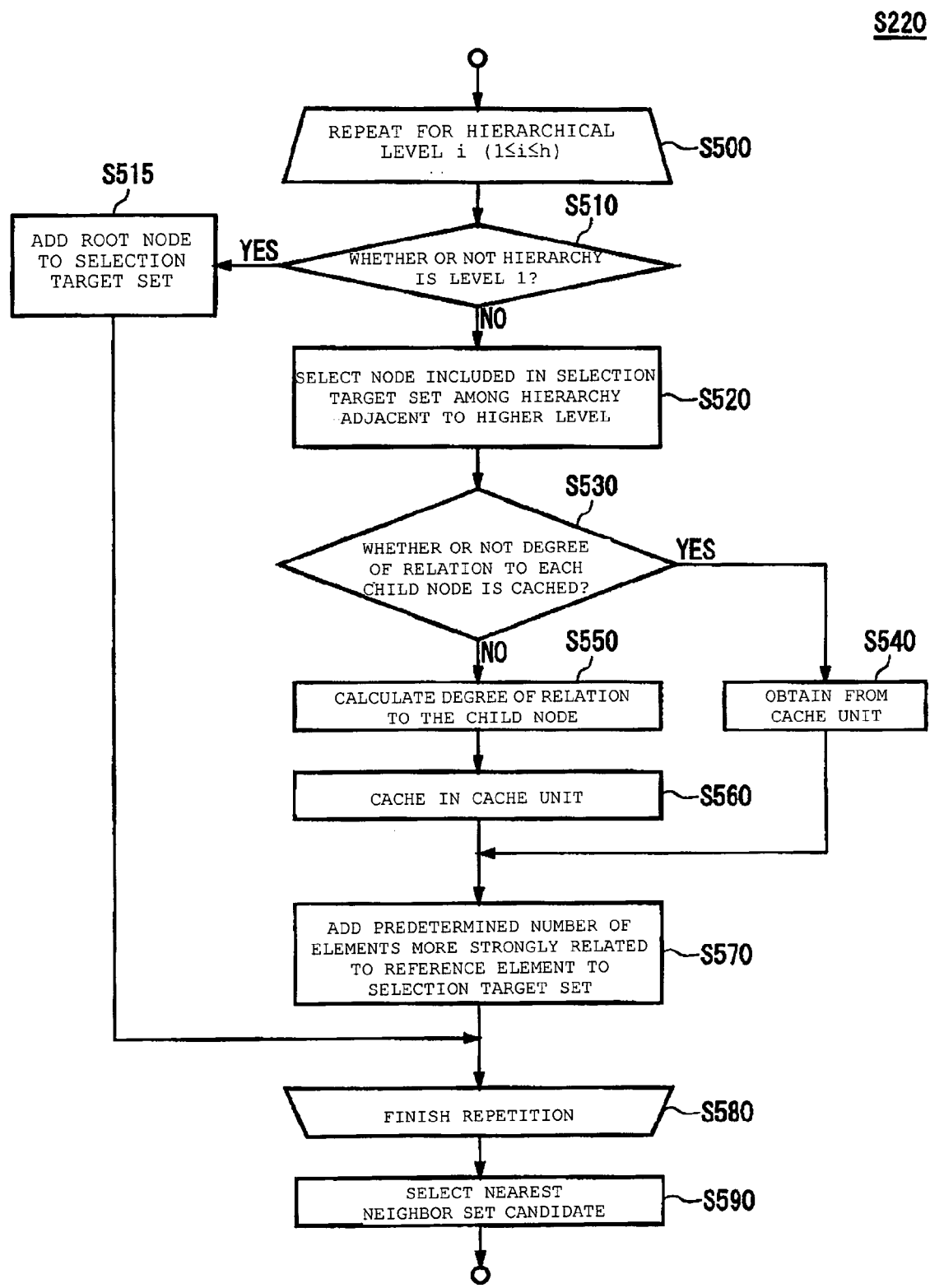
FIG. 5 shows an operational flow of processing in S220 of FIG. 2

FIG. 5 shows an operational flow of the processing in S220 of FIG. 2. For the respective hierarchies of SASH, the nearest neighbor set candidate selection unit 110 repeats the following processing (S500). Note that the levels of the respective hierarchies are set to 1 to h, and the hierarchical level to be processed is set to i. First, if the hierarchy to be processed is the level 1 (S510: YES), the nearest neighbor set candidate selection unit 110 adds a root node in SASH to be processed to a selection target set (S515), and moves on to S580 for the next repetition processing.

On the other hand, if the hierarchy to be processed is not the level 1 (S510: NO), first, the nearest neighbor set candidate selection unit 110 selects nodes included in the selection target set among hierarchies adjacent to a higher level of the hierarchy to be processed (S520). Next, for each of child nodes of these nodes selected from the higher hierarchy, the nearest neighbor set candidate selection unit 110 determines whether or not a relevance ratio showing a degree of a relation between a reference element and the node is cached in the cache unit 120 (S530).

If the relevance ratio is cached in the cache unit 120, the nearest neighbor set candidate selection unit 110 obtains the cached relevance ratio from the cache unit 120 (S540), and moves on to S570. On the other hand, if the relevance ratio is not cached in the cache unit 120, the nearest neighbor set candidate selection unit 110 calculates a relevance ratio between the reference element and the node (S550). Thereafter, the nearest neighbor set candidate selection unit 110 allows the cache unit 120 to cache the calculated relevance ratio (S560).

Subsequently, based on the relevance ratio obtained from the cache unit 120 or the newly calculated relevance ratio, the nearest neighbor set candidate selection unit 110 adds a predetermined number of elements strongly related to the reference element to the selection target set (S570). The number of elements added to the selection target set by the nearest neighbor set candidate selection unit 110 may differ according to the hierarchical levels, for example. In each hierarchy i, the number of elements added to the selection target set by the nearest neighbor set candidate selection unit 110 is set to $K_i$. In this case, $K_i$ is preferably expressed by the following formula (2), for example.

[Formula 2]
$$k_i = \max\{k^{1-\frac{h-i}{\log_2 n}}, \frac{1}{2}pc\} \tag{2}$$

[Formula 3]
$$k^{1-\frac{h-i}{\log_2 n}} \tag{3}$$

[Formula 4]
$$\frac{1}{2}pc \tag{4}$$

Here, according to the term of the formula (3), if the number of elements included in each hierarchy is large, the nearest neighbor set candidate selection unit 110 selects more elements as the selection target set, compared with the case where the number is small. The term of the formula (4) defines a lower limit of the number of elements selected as the selection target set from each hierarchy. Specifically, even if the hierarchy to be selected is a relatively higher hierarchy, the nearest neighbor set candidate selection unit 110 selects the elements according to the number defined by the formula (4) as the lower limit.

The nearest neighbor set candidate selection unit 110 repeats the above-described processing for each hierarchy of SASH (S580). Subsequently, the nearest neighbor set candidate selection unit 110 selects, as nearest neighbor set candidates, a predetermined number of nodes more strongly related to the reference element among the selection target set (S590). It is preferable that the nearest neighbor set candidate selection unit 110 selects, as nearest neighbor set candidates, elements of the number previously set to a value of a pre-fixed number or more, the elements being more strongly related to the reference element, among the selection target set. In this case, the nearest neighbor set candidate selection unit 110 may use the relevance ratio cached in the cache unit 120 in order to select the nearest neighbor set candidates.

As described above in FIG. 5, for each SASH, the nearest neighbor set candidate selection unit 110 selects the selection target set based on the structure of the SASH. Thus, the nearest neighbor set candidate selection unit 110 can generate a plurality of selection target sets, in which groups of the included elements are different from each other, among the entire elements. For each of the plurality of selection target sets generated, the nearest neighbor set candidate selection unit 110 selects, as the nearest neighbor set candidates, groups of elements more strongly related to the reference element among the selection target set. Thus, the nearest neighbor set can obtain a plurality of different nearest neighbor set candidates.

Figure 6:
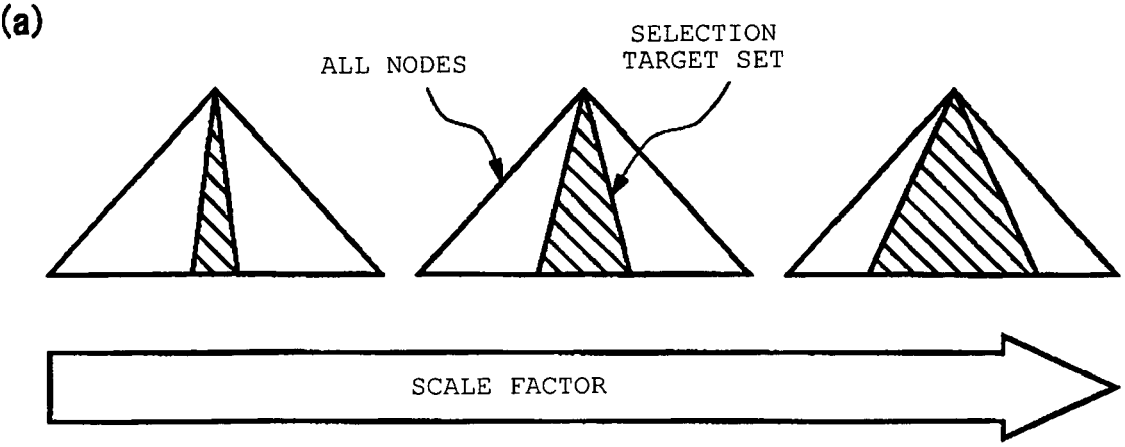
FIGS. 6(a) and 6(b) are views showing the concept of a selection target set.

FIGS. 6(*a*) and 6(*b*) are views showing the concept of the selection target set. FIG. 6(*a*) shows changes of the selection target sets in the case of changing $K_i$ that is the number of elements selected as the selection target set from each hierarchy. Note that parameters which define $K_i$ are set to a scale factor. The entire white triangle shown in FIG. 6(*a*) indicates the entire SASH. Each of the shaded triangles indicates the selection target set. As is clear from the FIG. 6(*a*), the number of elements in the selection target set is increased by increasing the scale factor to increase $K_i$.

FIG. 6(*b*) shows the number of times of calculating a relevance ratio changing according to the scale factor, and accuracy of the nearest neighbor set candidates. When the scale factor is increased, the selection target set is increased. Thus, the number of times of calculating the relevance ratio is increased. Moreover, when the scale factor is increased, the selection target set is increased. Thus, the accuracy of the nearest neighbor set candidates is enhanced. Specifically, there is a trade-off relationship between the number of times of calculating the relevance ratio and the accuracy of the nearest neighbor set candidates. In this regard, the selection device 10 according to this embodiment can improve a trade-off ratio by calculating a nearest neighbor set based on a plurality of nearest neighbor set candidates.

Figure 7:
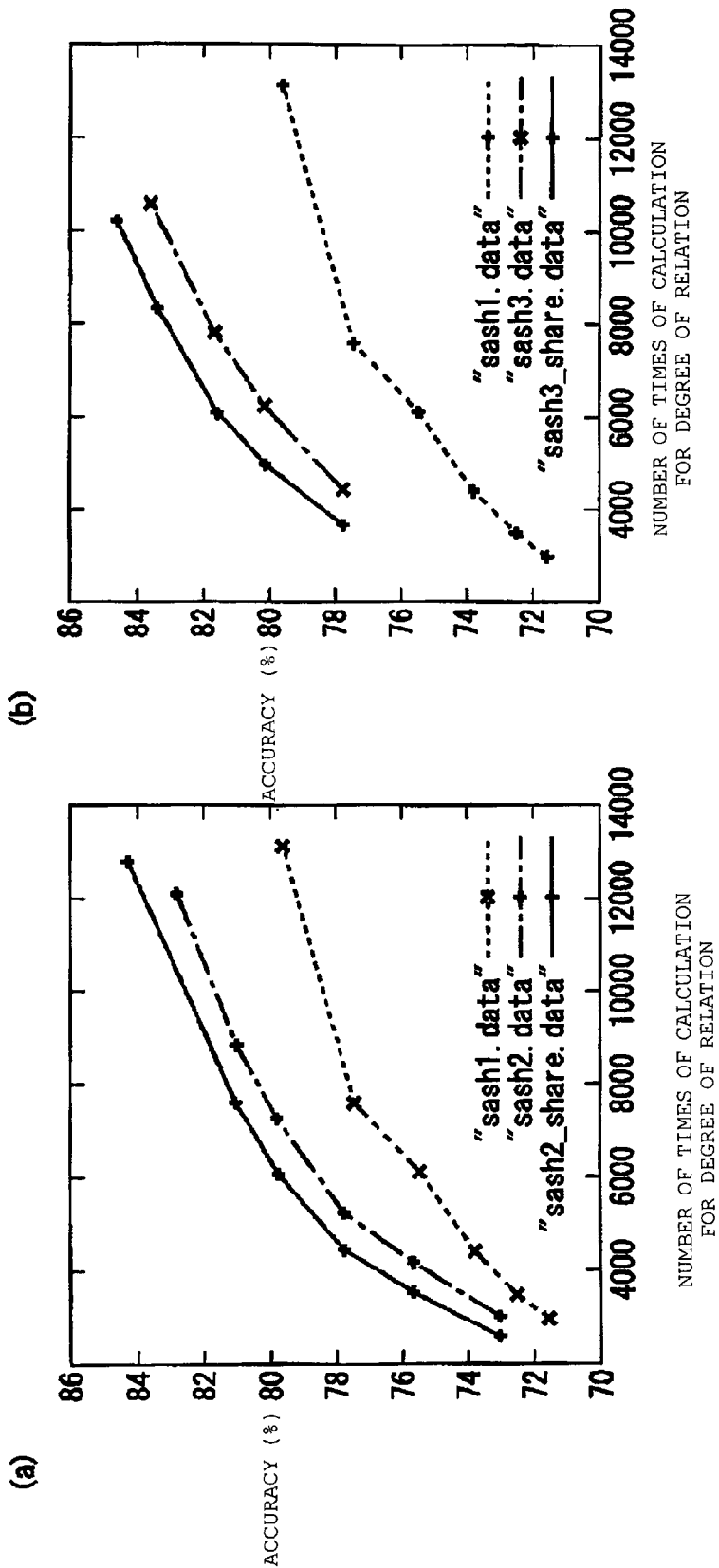
FIGS. 7(a) and 7(b) are graphs showing effects of this embodiment.

FIGS. 7(*a*) and 7(*b*) are graphs showing effects of this embodiment. By use of the selection device 10 described in this embodiment, accuracy of the nearest neighbor set with respect to the number of times of calculating the relevance ratio is measured by experiment. A document to be selected in the experiment is a news article in TREC-6 L.A. Times database. This database is formed of 127738 of 6590-dimensional real-valued feature vectors. For weighting of coordinate axes of the vectors, TF/IDF (Term Frequency/Inverse Document Frequency) is used (see Non-Patent Document 7).

As to the following five cases, the accuracy of the nearest neighbor set is measured.

1. Select a nearest neighbor set based on only one SASH (sash1.data)
2. Select two nearest neighbor set candidates based on two SASH, and select a nearest neighbor set based on these nearest neighbor sets (sash2.data)
3. In addition to the above case 2, cache a relevance ratio calculated to further select nearest neighbor set candidates (sash2_share.data)
4. Select three nearest neighbor set candidates based on three SASH, and select a nearest neighbor set based on these nearest neighbor sets (sash3.data)
5. In addition to the above case 4, cache a relevance ratio calculated to further select nearest neighbor set candidates (sash3_share.data)

As is clear from FIGS. 7(*a*) and 7(*b*), compared with the case where the nearest neighbor set is selected based on only one SASH, the selection device 10 can calculate a more accurate nearest neighbor set in a shorter computation time.

Subsequently, the reason why the selection device 10 in this embodiment can more accurately select the nearest neighbor set will be described below. As described above, the nearest neighbor set candidate selection unit 110 selects a plurality of different nearest neighbor set candidates. These nearest neighbor set candidates are set to $A^1, A^2, \ldots A^r$. Specifically, a union of nearest neighbor sets is $A^1.A^2\ldots A^r$. Moreover, a pre-fixed number is set to k. Here, a true nearest neighbor set is set to A*. Furthermore, among elements of the respective $A^1, A^2, \ldots A^r$, an expected value of a proportion of elements included in A* is set to p. However, p is a value not less than 0 and not more than 1. In this event, if $A^i.A^*$ is uniformly selected from A*, the following fact is derived.

$$<|A.A^*|>_i = pk \quad (5)$$

$$<|(A^1.A^2\ldots A^r).A^*|>_i = (1-(1-p)^r)k \quad (6)$$

Here, $<.>_i$ is an operator indicating an expected value for random numbers in generation of SASH. The equation (5) shows that an average of pk elements of the true nearest neighbor set are included in the nearest neighbor set candidates selected based on SASH. Moreover, the equation (6) shows that, if r of SASH are generated and nearest neighbor set candidates are selected based on each SASH, an average of $(1-(1-p)^r)k$ of elements in the true nearest neighbor set are included in the union of nearest neighbor set candidates. As is evident from this equation, by increasing r, a proportion of the elements of the true nearest neighbor set, which are included in the union of nearest neighbor set candidates, can be increased.

Here, $A^i.A^*$ is not always uniformly selected from A*. However, the selection device 10 can approximately uniformly select $A^1.A^*$ from A* by allowing the seeds of random numbers to be different for each nearest neighbor set. Specifically, although accuracy does not always conform to the theoretical value shown in the equation (6), the selection device 10 can improve the accuracy of the nearest neighbor set in accordance with the number of the nearest neighbor set candidates.

Note that, preferably, by devising processing of generating SASH as below, the accuracy of the nearest neighbor set is improved. To be more specific, in the case of sequentially generating a plurality of SASH, the hierarchical structure data generation unit 100 does not arrange groups of nodes, which are arranged in hierarchies adjacent to each other in the already generated SASH, in hierarchies adjacent to each other in SASH to be newly generated. Moreover, it is more preferable that the hierarchical structure data generation unit 100 controls a proportion of the groups of nodes arranged in hierarchies adjacent to each other in SASH to be newly generated, among the groups of nodes arranged in the hierarchies adjacent to each other in the already generated SASH, to be not more than a reference value. Thus, it is possible to efficiently improve the accuracy of the nearest neighbor set by use of fewer SASH.

Figure 8:
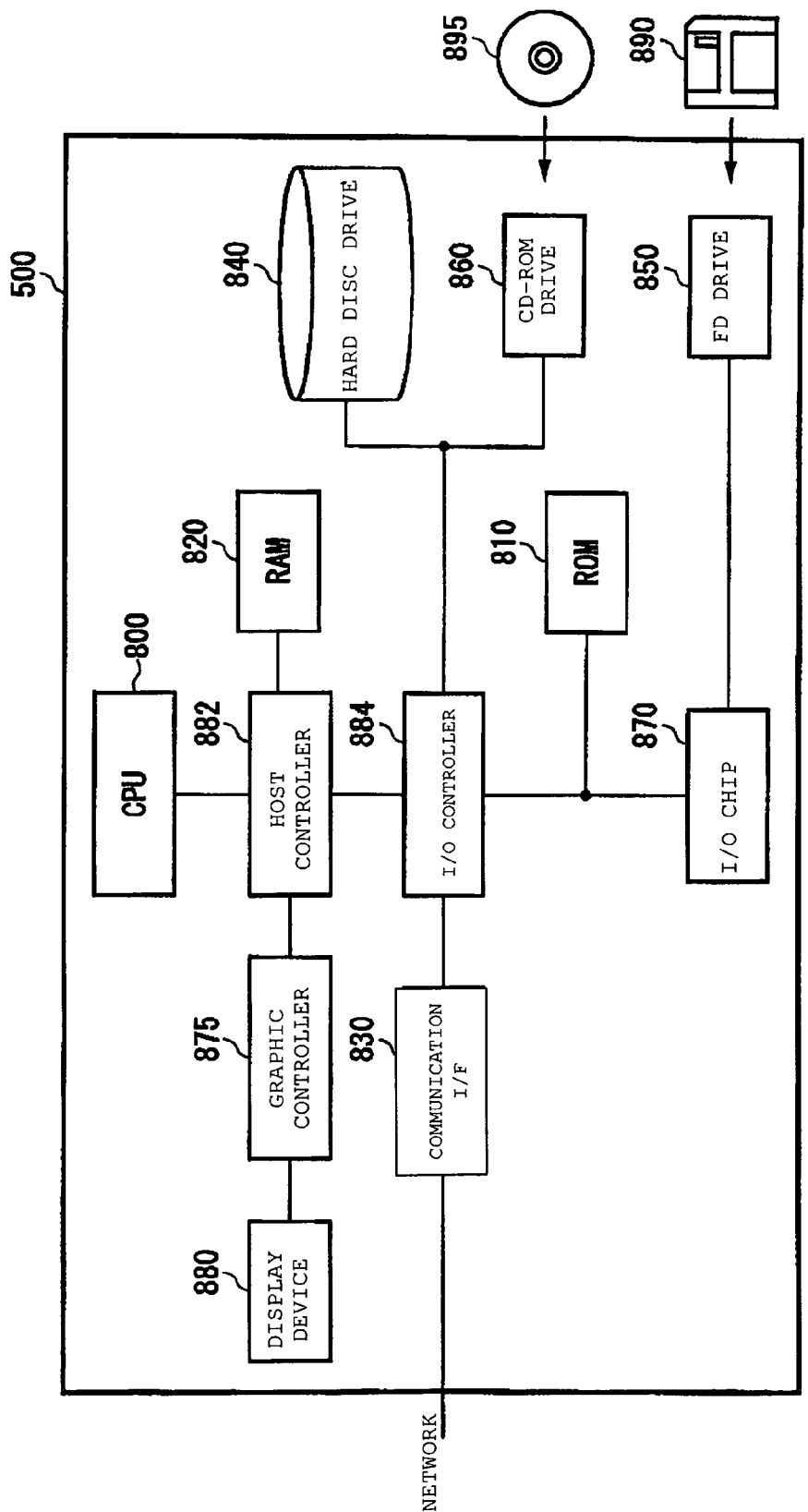
FIG. 8 shows an example of a hardware configuration of a computer 500 which functions as the selection device 10.

FIG. 8 shows an example of a hardware configuration of a computer 500 which functions as the selection device. The computer 500 includes: a CPU peripheral unit having a CPU 800, a RAM 820, and a graphic controller 875, which are connected to each other by a host controller 882; an input/output unit having a communication interface 830, a hard disk drive 840, and a CD-ROM drive 860, which are connected to the host controller 882 by an input/output controller 884; and a legacy input/output unit having a BIOS 810, a flexible disk drive 850, and an input/output chip 870, which are connected to the input/output controller 884.

The host controller 882 connects the RAM 820 to the CPU 800 and the graphic controller 875, both of which access the RAM 820 at a high transfer rate. The CPU 800 is operated based on programs stored in the BIOS 810 and the RAM 820, and controls the respective units. The graphic controller 875 obtains image data generated on a frame buffer provided in the RAM 820 by the CPU 800 or the like, and displays the image data on a display unit 880. Alternatively, the graphic controller 875 may include therein a frame buffer storing the image data generated by the CPU 800 or the like.

The input/output controller 884 connects the host controller 882 to the communication interface 830, the hard disk drive 840, and the CD-ROM drive 860, which are relatively high-speed input/output units. The communication interface 830 communicates with an external device through a network. The hard disk drive 840 stores programs and data which are used by the computer 500. The CD-ROM drive 860 reads programs or data from a CD-ROM 895, and provides the programs or data to the input/output chip 870 through the RAM 820.

Moreover, the input/output controller 884 is connected to the BIOS 810 and relatively low-speed input/output units such as the flexible disk drive 850 and the input/output chip 870. The BIOS 810 stores a boot program executed by the CPU 800 when the computer 500 is started, a program dependent on the hardware of the computer 500, and the like. The flexible disk drive 850 reads programs or data from a flexible disk 890, and provides the programs or data to the input/output chip 870 through the RAM 820. The input/output chip 870 connects various input/output units through the flexible disk 890 or a parallel port, a serial port, a keyboard port, a mouse port, and the like, for example.

The programs provided to the computer 500 are stored in a recording medium such as the flexible disk 890, the CD-ROM 895 or an IC card, and are provided by a user. The programs are read from the recording medium through the input/output chip 870 and/or the input/output controller 884, installed on the computer 500 and executed. The program installed on the computer 500 to be executed acts on the computer 500 to perform operations. Since the operations are the same as those in the computer 500 described in FIGS. 1 to 7, description thereof will be omitted.

The programs described above may be stored in an external storage medium. As the storage media, an optical recording media such as a DVD and a PD, a magneto-optical media such as a MD, a tape medium, a semiconductor memory such as the IC card, and the like can be used, other than the flexible disk 890 and the CD-ROM 895. Moreover, a storage device such as a hard disk drive or a RAM, which is provided in a server system connected to a dedicated communication network or the Internet, may be used as a recording medium, and programs may be provided to the computer 500 through the network.

As described above in this embodiment, the selection device 10 selects each of a plurality of nearest neighbor set candidates based on each of a plurality of hierarchical structure data. Thereafter, the selection device 10 selects a nearest neighbor set among a union of the nearest neighbor set candidates. Thus, it is possible to improve a trade-off ratio between a computation time and accuracy in the case where the nearest neighbor set candidates are selected from one piece of hierarchical structure data. Specifically, for example, the selection device 10 can improve accuracy of the nearest neighbor set without increasing the computation time.

Furthermore, the selection device 10 described in this embodiment can be applied to a classification device for classifying elements by use of a k-near neighbor (for example, see Non-Patent Document 5). Specifically, a module to obtain a nearest neighbor set in this classification device can be directly replaced by the selection device 10 described in this embodiment. Thus, classification accuracy of a conventional classification device can be easily enhanced.

Although the present invention has been described above by use of the embodiment, the technical scope of the present invention is not limited to that described in the foregoing embodiment. It is apparent to those skilled in the art that various changes or modifications can be added to the foregoing embodiment. It is apparent from the description of the scope of claims that embodiments to which such changes or modifications are added can be also included in the technical scope of the present invention.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A selection device for selecting a nearest neighbor set among a plurality of elements, the nearest neighbor set being a set of elements each having a relation to a predetermined reference element, a degree of the relation meeting a predetermined condition, the selection device comprising:

a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set;

a nearest neighbor set selection unit for selecting, as the nearest neighbor set, a set of elements having relations, degrees of which meet the predetermined condition, to the reference element, among a union of the plurality of nearest neighbor set candidates; and a hierarchical structure data generation unit which sets the plurality of elements as nodes, generates a plurality of hierarchical structure data having a data structure in which the plurality of nodes are classified into any of a plurality of hierarchies, and generates an edge between a node classified into each of the plurality of hierarchies and another node adjacent to the hierarchy, for each of the plurality of hierarchical structure data, based on a degree of relation between the node and the other node, wherein, for each of the plurality of hierarchical structure data, the nearest neighbor set candidate selection unit selects one nearest neighbor set candidate based on the hierarchical structure data.

2. The selection device according to claim 1,
wherein the hierarchical structure data generation unit generates the plurality of hierarchical structure data different from each other by using seeds of random numbers different for each of the hierarchical structure data and randomly classifying each of the plurality of nodes into any of the plurality of hierarchies.

3. The selection device according to claim 1,
wherein, in each of the plurality of hierarchical structure data, for each of nodes to be processed, which are classified into each of a plurality of hierarchies, the hierarchical structure data generation unit selects, as parent nodes, a predetermined number of nodes determined to be more strongly related to the node to be processed among nodes positioned in a hierarchy adjacent to a higher level of the hierarchy, and generates edges between the node to be processed and each of the selected parent nodes, for each of the nodes to be processed, which are classified into each of the plurality of hierarchies, the hierarchical structure data generation unit further selects a set of nodes having the node to be processed as a parent node among nodes positioned in a hierarchy adjacent to a lower level of the hierarchy, selects, as child nodes, a predetermined number of nodes determined to be more strongly related to the node to be processed among the selected set, and generates edges between the node to be processed and each of the child nodes selected, and for each of the plurality of hierarchies, the nearest neighbor set candidate selection unit selects a group of not more that a predetermined number of child nodes more strongly related to the reference element among child nodes of nodes already selected on a higher hierarchy, and selects, as the nearest neighbor set candidates, a predetermined number of nodes more strongly related to the reference element among the nodes selected for each of the hierarchies.

4. The selection device according to claim 1, further comprising:

a cache unit which caches a degree of a relation between the reference element and each of the other elements, the degree being calculated by the nearest neighbor set candidate selection unit to select elements more strongly related to the reference element, wherein, in the case of selecting the elements more strongly related to the reference element, if a degree of a relation between the reference element and each of elements to be selected is not cached in the cache unit, the nearest neighbor set candidate selection unit calculates the degree of the relation between the reference element and the element and allows the cache unit to cache the degree of the relation between the reference element and the element, and if the degree of the relation between the reference element and each of the elements to be selected is cached in the cache unit, the nearest neighbor set candidate selection unit selects elements more strongly related to the reference element based on the cached degree of the relation.

5. The selection device according to claim 1, wherein the nearest neighbor set candidate selection unit sequentially selects a plurality of nearest neighbor set candidates until the number of times of calculating a degree of a relation between the reference element and each of the other elements reaches a predetermined pre-fixed number of times.

6. A selection device for selecting a nearest neighbor set among a plurality of elements, the nearest neighbor set being a set of elements each having a relation to a predetermined reference element, a degree of the relation meeting a predetermined condition, the selection device comprising:

a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set;

a nearest neighbor set selection unit for selecting, as the nearest neighbor set, a set of elements having relations, degrees of which meet the predetermined condition, to the reference element, among a union of the plurality of nearest neighbor set candidates;

wherein the nearest neighbor set selection unit selects, as the nearest neighbor set, a set of a predetermined pre-fixed number of elements more strongly related to the reference element among a union of the plurality of nearest neighbor set candidates; and wherein the nearest neighbor set candidate selection unit selects, as each of the plurality of nearest neighbor set candidates, a set of not less than the pre-fixed number of elements determined to be more strongly related to the reference element.

7. A selection device for selecting a nearest neighbor set among a plurality of elements, the nearest neighbor set being a set of elements each having a relation to a predetermined reference element, a degree of the relation meeting a predetermined condition, the selection device comprising:

a nearest neighbor set candidate selection unit for selecting, among the plurality of elements, a set of elements determined that the set of elements have stronger relations to the reference element, as each of a plurality of nearest neighbor set candidates, which are a plurality of different candidates for the nearest neighbor set;

a nearest neighbor set selection unit for selecting, as the nearest neighbor set, a set of elements having relations, degrees of which meet the predetermined condition, to the reference element, among a union of the plurality of nearest neighbor set candidates;

wherein the nearest neighbor set selection unit selects, as the nearest neighbor set, a set of a predetermined pre-fixed number of elements more strongly related to the reference element among a union of the plurality of nearest neighbor set candidates; and wherein the nearest neighbor set candidate selection unit sequentially selects a plurality of nearest neighbor set candidates until the number of elements in a union of already selected nearest neighbor set candidates reaches a union reference quantity previously set to a value of not less than the pre-fixed number.

8. A selection device for selecting a nearest neighbor set among a plurality of reference elements, reference document and other documents, the nearest neighbor set being a set of elements each having a relation to a predetermined reference element, a degree of the relation meeting a predetermined condition, the selection device comprising:

a nearest neighbor set candidate selection unit for selecting, among the plurality of elements, a set of elements determined from a relevance ratio that the set of elements have stronger relations to the reference element, as each of a plurality of nearest neighbor set candidates, which are a plurality of different candidates for the nearest neighbor set;

a nearest neighbor set selection unit for selecting, as the nearest neighbor set, a set of elements having relations, degrees of which meet the predetermined condition, to the reference element, among a union of the plurality of nearest neighbor set candidates; and a nearest neighbor set selection unit for calculating said relevance ratio between said reference document and each of said other documents included in the union of the nearest neighbor set candidates based on the number of keywords included in said reference document and said other documents in common, wherein the selection device is a device which selects, as the nearest neighbor set, a set of moving images strongly related to a predetermined reference moving image among a plurality of moving images, the nearest neighbor set candidate selection unit selects, as each of the plurality of nearest neighbor set candidates, a set of moving images determined to be more similar to the reference moving image among the plurality of moving images, and the nearest neighbor set selection unit selects, as the nearest neighbor set, moving images having a degree of similarity to the reference image, the degree of similarity meeting a predetermined condition, among a union of the plurality of nearest neighbor set candidates.

* * * * *